(12) United States Patent
Broberg et al.

(10) Patent No.: US 7,216,296 B1
(45) Date of Patent: May 8, 2007

(54) METHOD AND APPARATUS FOR CONTROLLED FORCE DEPLOYMENT OF USER INTERFACE DEVICES

(75) Inventors: David W. Broberg, Riverside, CA (US); Burt Bregman, Valley Village, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 850 days.

(21) Appl. No.: 10/254,617

(22) Filed: Sep. 25, 2002

(51) Int. Cl.
*G06F 17/10* (2006.01)

(52) U.S. Cl. ...................... 715/701; 715/745

(58) Field of Classification Search ........ 715/771–773, 715/841, 842, 744–747, 701, 702, 970; 340/540–542; 604/30, 31; 224/30; 701/301; 342/36
See application file for complete search history.

(56) References Cited

U.S. PATENT DOCUMENTS

| | | | | |
|---|---|---|---|---|
| 5,182,796 A | * | 1/1993 | Shibayama et al. ......... | 715/841 |
| 5,835,877 A | * | 11/1998 | Unuvar et al. ............... | 701/93 |
| 6,064,937 A | * | 5/2000 | Yang ........................... | 701/93 |
| 6,349,700 B1 | * | 2/2002 | Buckland et al. ............ | 123/352 |
| 2001/0056544 A1 | * | 12/2001 | Walker ......................... | 713/200 |
| 2002/0038102 A1 | * | 3/2002 | McFarlin et al. ............. | 604/30 |
| 2002/0135474 A1 | * | 9/2002 | Sylliassen ..................... | 340/540 |
| 2004/0168843 A1 | * | 9/2004 | Lankes et al. ............... | 180/178 |
| 2005/0015202 A1 | * | 1/2005 | Poe et al. ..................... | 701/301 |
| 2005/0128129 A1 | * | 6/2005 | Conner et al. ................ | 342/36 |
| 2006/0131094 A1 | * | 6/2006 | Lankes et al. ............... | 180/338 |

* cited by examiner

*Primary Examiner*—Steven P. Sax
(74) *Attorney, Agent, or Firm*—Nathan O. Jensen; Kyle Eppele (57) ABSTRACT

User interface devices, such as displays and keyboards, are automatically deployed using pulse-width-modulated controlled force in a first safety period. Once safe, force and speed are increased to full deployment. At full deployment, electrical braking dissipates mechanical energy and power is throttled down to hold device against deployment stop.

22 Claims, 7 Drawing Sheets

METHOD AND APPARATUS FOR CONTROLLED FORCE DEPLOYMENT OF USER INTERFACE DEVICES

FIELD OF THE INVENTION

This invention relates generally to deployable user interface devices.

BACKGROUND OF THE INVENTION

The notion of providing retractable devices is not new. For many years, a wide variety of industries have used retractable devices such as keyboards and displays. These are just two examples of user interface devices that may be used in a deployed position and then retracted when they are not needed or otherwise intrude into a cluttered space.

The aircraft industry has long used retractable user interface devices because of the limited operational space that is available either in the cockpit or in the passenger compartment of an aircraft. It is not uncommon to discover retractable keyboards that are used to control equipment disposed in the flight deck. Once the keyboard is not needed, it can be stowed so that it does not continue to clutter the operating space. This helps to promote the operational safety of the aircraft. Although not as common, retractable display devices may also be used in the flight deck.

In the passenger compartment of an aircraft, retractable display devices are much more prevalent. In many cases, retractable display devices may comprise an in-flight entertainment (IFE) system. For instance, retractable display devices may be used to present entertainment content to passengers. Retractable display devices that may be used in IFE systems may take on many different forms. One example of a retractable display device is that of a personal display unit that may be stowed in the arm of a passenger seat. When the display is in use, it may be deployed outward from the passenger seat arm and articulated into a comfortable viewing position. Another form of retractable display device that may be used in IFE applications is that of an overhead monitor. An overhead monitor is typically installed in the ceiling of the passenger compartment or it may be disposed at the bottom surface of luggage compartments. When an overhead monitor is installed in either of these manners, it typically deploys downward into the passenger space.

Other example applications of retractable display devices and keyboards may be found in the automotive industry. Here, stereo systems, navigation systems and automotive control systems may benefit from the application of retractable displays and keyboards. For instance, a deployable heads-up-display may be disposed above the control console of an automobile. The heads-up-display may be used to enhance night vision. In this type of an application, it would be beneficial to retract the heads-up-display when it is not needed. Even some stereo systems meant for use in cars may comprise deployable keyboards because of the limited amount of space available on the console for conventional controls.

The most advanced of these deployable user interface devices comprise mechanisms for automatic deployment and retraction of the user interface assembly. It is not uncommon to find a retractable overhead display installed in the passenger compartment of an aircraft that automatically responds to a deployment signal. When the deployment signal is active, this type of overhead display deploys the functional-end of the display screen into the passenger space. Likewise, when the deployment signal becomes inactive, the display screen may be retracted; promoting passenger comfort and safety.

In all of these cases, automatic deployment and retraction of a user interface provides a significant level of convenience. However, as with any mechanized assembly, there exists the potential to harm human life and limb. Up until now, deployable user interface devices that are automatically driven into the user's space have done so using a constant force. If allowed to operate in this type of an unrestrained fashion, deployment of a user interface assembly may inadvertently apply harmful pressure to an innocent bystander.

Despite the convenience they offer, automatically deployed user interface devices such as keyboards and displays rigidly maintain their deployment position. There may be situations where a deployed user interface assembly must be retracted in an exigent circumstance. One such situation is commonly encountered in an aircraft application of an overhead display; a passenger inadvertently collides with the deployed display screen comprising the display assembly. In this case, it is likely that the passenger will sustain physical injury if the fully deployed position is rigidly maintained.

SUMMARY OF THE INVENTION

The present invention comprises a method for driving a deployable user interface device. According to one illustrative method of the present invention, the amount of force applied to a movable portion of the deployable user interface device is varied according to time or distance traveled in the deployment. First, as the deployable device begins moving, motion information may be used to determine the rate at which the deployable device is traveling. At the beginning of deployment, the method of the present invention provides for an obstacle clearance interval. During this interval, if the rate of deployment falls below a pre-established threshold, deployment is terminated and the deployable member comprising the user interface device may be retracted. Typically, the power applied to an actuator that causes the deployable member to move is reduced during this interval so that the force that the movable member can impart onto an obstacle is abridged.

According to the present method, once the deployable member comprising the user interface device has traveled beyond the obstacle clearance space, as determined by motion rate and time, the method of the present invention provides that the power applied to the actuator should be increased. This allows for rapid deployment once the deployable member has traveled past the obstacle clearance space. The method further provides that the amount of power applied to the actuator should be reduced to a holding level sufficient to maintain the position of the deployable member comprising the user interface device in a fully deployed position.

Once the deployable member comprising the user interface device has reached its fully deployed position, the method of the present invention further provides that the power applied to the actuator may be reversed if the motion information indicates that the deployable member has receded from its fully deployed position by a pre-established threshold. Where the deployable member has been bumped or jarred, this variation of the inventive method provides for rapid retraction of the deployed member.

According to one variation of the inventive method taught here, application of power in order to initiate deployment of the device may actually comprise two separate process steps. A first step may comprise application of a substantially full power level to the actuator so that the deployable member may clear a mechanical latch that may be used to retain the deployable member in a stowed position. Once the deployable member has cleared such a mechanical latch, power may be reduced in order to limit the amount of force that the deployable member may impart onto any obstacle that may be present in its path during the obstacle clearance interval.

Two example methods are described for limiting the amount of power applied to the actuator. According to one method, power may be cyclically applied for a first time period and then remove for a second time period. The ratio between the two time periods may dictate the amount of power that is applied to the actuator. According to an alternative method, the amount of electrical current supplied to an electrical actuator may be regulated as a means of controlling power delivery to the actuator. Both of these techniques may be applied whenever the method of the present invention calls for reducing the amount of power that should be applied to the actuator. There are at least two intervals where the present method suggests that power should be limited. These are the obstacle clearance interval and a full-deployment hold position. In the latter, power is reduced to a level that is sufficient to maintain contact with a deployment stop.

The method of the present invention also provides for a braking action near the end of the deployment travel. According to the method of the present invention, the act of reducing power to a holding level may actually comprise two steps; electrical braking and full-deployment hold. In cases where the actuator is an electrical device comprising an electrical coil contained within a magnetic field, the present method provides for allowing the electrical coil to resist changes in the magnetic field for a pre-established braking interval. This allows for kinetic energy in the deployable member to be dissipated by the electrical coils comprising the actuator.

The present invention further comprises an apparatus. The apparatus comprises a deployable user interface device that embodies the methods of the present invention. According to one example embodiment, the deployable user interface device may comprise a base structure that may be used to mount the device. A deployable user interface assembly, i.e. a deployable member, may also comprise the apparatus of the present invention and this is typically moveably attached to the base structure. The deployable user interface device further comprises a motion sensor that detects motion of the deployable user interface assembly. Further comprising the invention is a full-deployment sensor that generates a signal when the deployable user interface assembly is fully deployed. According to one alternative embodiment of the present invention, the deployable user interface comprises a display screen pivotally mounted to the base structure such that the deployable user interface device actually comprises an overhead display unit.

According to one alternative embodiment, the present invention further comprises an actuator that may cause the deployable member of the device to move from a stowed position to a deployed position. An actuator control unit further comprises the invention and in one embodiment applies power to the actuator in order to cause the user interface assembly to move out of the stowed position. The actuator control unit may further reverse the power applied to the actuator if it detects that the rate-of-motion as indicated by the motion sensor fails to meet a first pre-established threshold. Once the user interface assembly has traveled at this minimum rate-of-motion for a pre-established interval of time, the actuator control unit may increase the power that it applies to the actuator. This pre-established interval of time is typically referred to as a "clearance interval". Increasing the power level may allow for rapid movement of the user interface assembly into its fully deployed position. Typically, the actuator control unit reduces the amount of power that it applies to the actuator to a holding level once full deployment is achieved.

According to one alternative embodiment of the present invention, the actuator control unit may reverse the power that it applies to the actuator if it detects, based on motion information provided by the motion sensor, that the deployable member has been moved away from its fully deployed position by a pre-established amount. This may cause the deployable member to be retracted back into a stowed position.

One additional alternative embodiment of the present invention provides that the actuator control unit may apply power to the actuator in two stages during the clearance interval. During a first stage, power may be applied at a substantially full power level in order to clear any mechanical latching mechanism that may be used to retain the deployable member in the stowed position. The power level may then be reduced for the remainder of the clearance interval in order to ensure the safety of any potential obstacle in the deployable member's travel path.

Controlling the amount of power that may be applied to the actuator may, according to one alternative embodiment, be accomplished by pulse-width-modulating the power. This may be accomplished by a pulse-width-modulating power controller that may further comprise the actuator control unit. According to yet another alternative embodiment, the actuator control unit may comprise a current regulator. The current regulator may be used to control the amount of electrical current that may be delivered to the actuator. Either of these devices may be used to control the amount of power applied to the actuator either during the clearance interval or during full-deployment hold.

According to one alternative embodiment of the present invention, the actuator that is used to enable movement of the user interface assembly (i.e. deployable member) may be an electrical device comprising an electrical coil that is contained in a magnetic field. The actuator control unit, according to this embodiment, may further comprise an electrical braking circuit. The electrical braking circuit may connect the input leads of the actuator to each other in order to cause an electrical braking effect. The actuator control unit may direct the electrical braking circuit to engage electrical braking prior to full deployment. Once full deployment is achieved, the actuator control unit may use a pulse-width-modulating controller to reduce the power applied to the actuator to a holding level.

BRIEF DESCRIPTION OF THE DRAWINGS

The foregoing aspects are better understood from the following detailed description of one embodiment of the invention with reference to the drawings, in which.

DETAILED DESCRIPTION OF THE INVENTION

The present invention comprises a method for deploying a deployable user interface according to a controlled force profile. The present invention also comprises an apparatus that embodies the methods taught herein. When a deployable device is automatically deployed from it's housing, it may be beneficial to initiate deployment with a modest amount of force in order to ensure that obstructions that may be present in the deployment path are not injured or harmed. Typically, this may be accomplished by reducing the amount of force that may be applied to the deployable member when deployment first starts.

Figure 1:
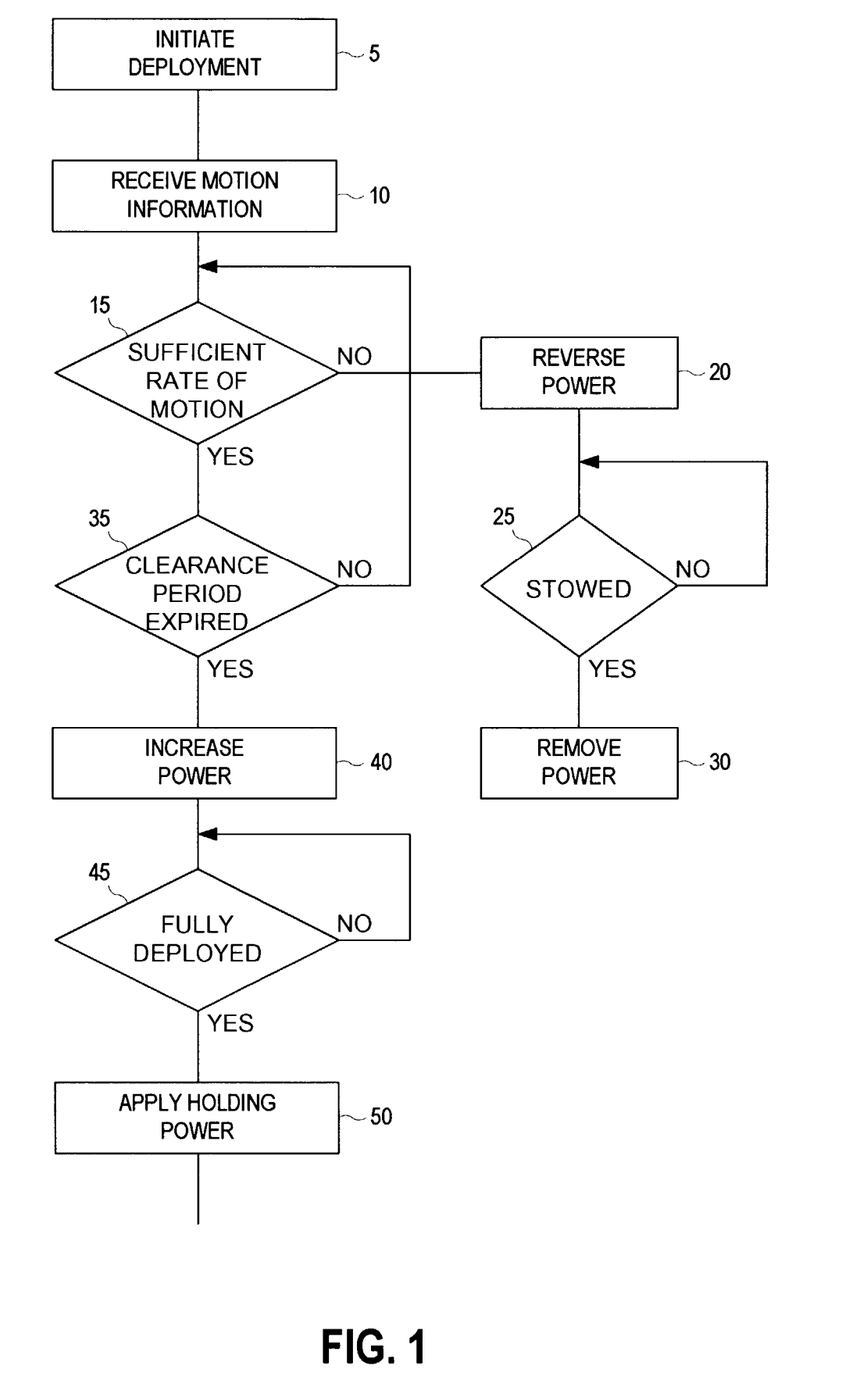
FIG. 1 is a flow diagram that depicts one illustrative process for deploying a deployable user interface from it's housing according to the present invention.

FIG. 1 is a flow diagram that depicts one illustrative process for deploying a deployable user interface from it's housing according to the present invention. The present method may be applicable in the case where an actuator is used to cause a deployable member to travel from a stowed position to a deployed position. Generally, deployment may begin (step 5) and motion information may be received (step 10). The motion information typically indicates the amount of travel that the deployable member has experienced.

According to the present method, the deployable member may be deployed at a reduced force level for some interval of time. This time interval may be referred to as the clearance interval. During this clearance interval, the rate of motion may be monitored and compared to a minimum motion rate (step 15). In the event that the motion rate fails to meet the minimum threshold, the present method infers that an obstacle may be present in the path of the deployable member. Hence, according to this variation of the inventive method, reverse power (step 20) may be applied to the actuator thereby causing the deployable member to retract back into it's housing (step 25). Power may then be removed (step 30).

Once the obstacle clearance interval expires (step 35), the present method provides that the power applied to the actuator should increase (step 40). Typically, the amount of power that is applied to the actuator is not increased unless the rate of motion exhibited by the deployable member exceeds a pre-established second rate threshold for a set period of time. The increased power may be applied until the deployable member is fully deployed (step 45). Once fully deployed, the present method provides that the amount of power applied to the actuator may be reduced to a holding level (step 50).

According to one variation of the present method, the rate-of-motion that the deployable member exhibits while substantially full power is applied to the actuator falls below a third rate-of-motion threshold, reverse power may be applied to the actuator in order to cause the deployable member to retract back into a stowed position. Hence, the method allows for the inference that an obstacle has been encountered somewhere during deployment. When full power is applied, the method acknowledges that the rate-of-motion should be at a greater level than when a reduced power is applied during the clearance interval.

It should be noted that the amount of power that may be necessary to drive the actuator at any stage of this method may be determined empirically. According to one example method, the amount of power that must be applied to ensure that an obstacle may be discovered during the clearance interval may be determined empirically and may consider factors such as the amount of force that the deployable member may apply upon any obstacle encountered. According to one variation of this method, the force may be throttled down to preclude injury to human life or limb or any other potential obstacle.

Figure 2:
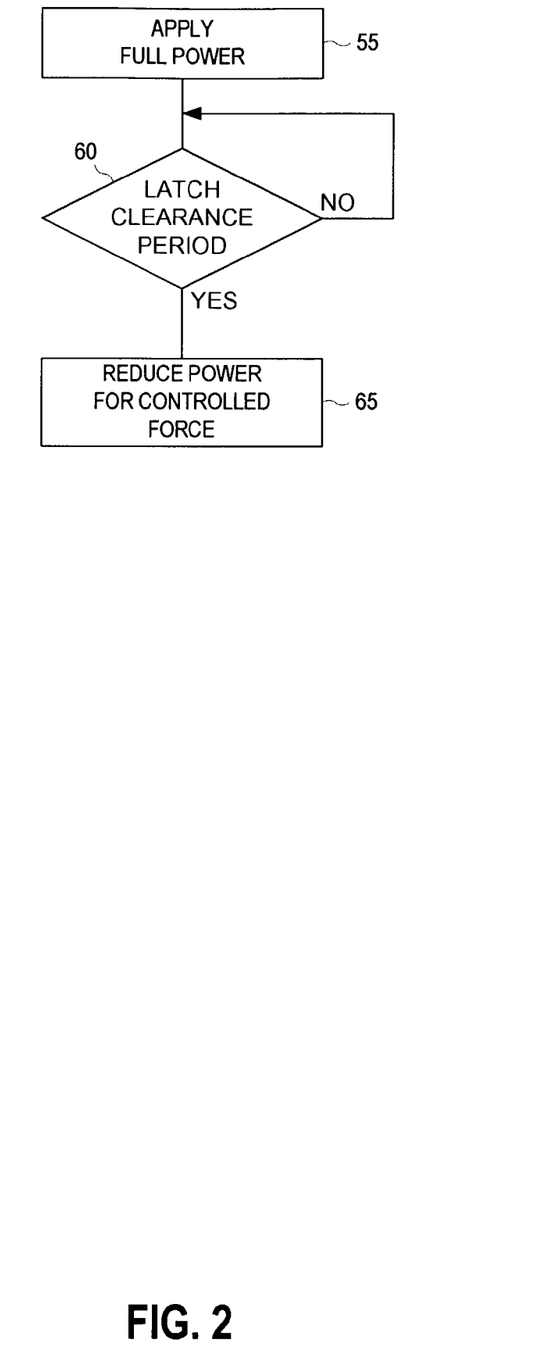
FIG. 2 is a flow diagram that depicts one possible process for clearing a latch that may be used to secure a deployable member in a stowed position according to the present invention.

FIG. 2 is a flow diagram that depicts one possible process for clearing a latch that may be used to secure a deployable member in a stowed position according to the present invention. The method of the present invention may provide that during the initial deployment of the deployable member, the amount of force applied to the deployable member may substantially approach a full power level until any mechanical latch that may be used to secure the deployable member in a stowed position has been cleared. Hence, the method provides for the application of substantially full power (step 35) to the actuator in order to cause the deployable member to clear such a mechanical latch. Once the latch clearance interval has expired (step 60), the force applied to the actuator may be reduced (step 65) to an empirically derived level to ensure the safety of any obstacle that may be encountered during the clearance interval.

Figure 3:
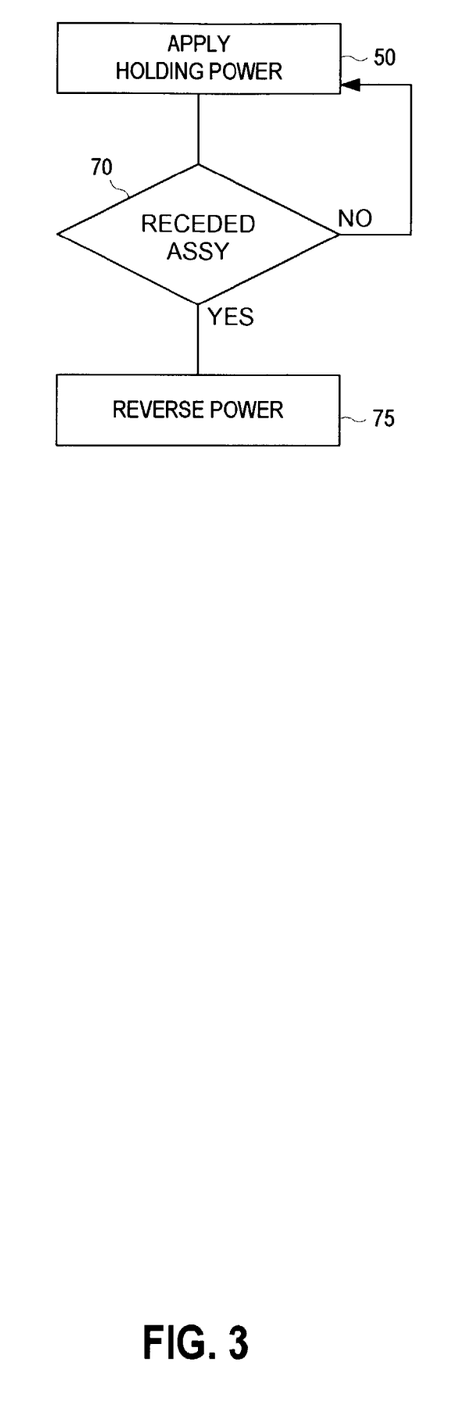
FIG. 3 is a flow diagram that depicts one illustrative method that may be used to retract a deployable user interface when it is forcibly caused to recede from it's fully deployed position.

FIG. 3 is a flow diagram that depicts one illustrative method that may be used to retract a deployable user interface when it is forcibly caused to recede from it's fully deployed position. According to one variation of the inventive method, the deployable member comprising a user interface is typically held in a fully deployed position by the application of power to the actuator at a reduced level. This is called the holding power level (step 50). By receiving motion information, the method of the present invention may determine if the deployable member has been forced away from it's fully deployed position (step 70). In this event, the method of the present invention may infer that the deployed member has been bumped or jarred by another object or by a human being. In this situation, the method of the present invention provides for the application of reverse power (step 75) to the actuator that controls the movement of the deployable member. This, then, causes the deployable member to be retracted into its stowed position.

Figure 4:
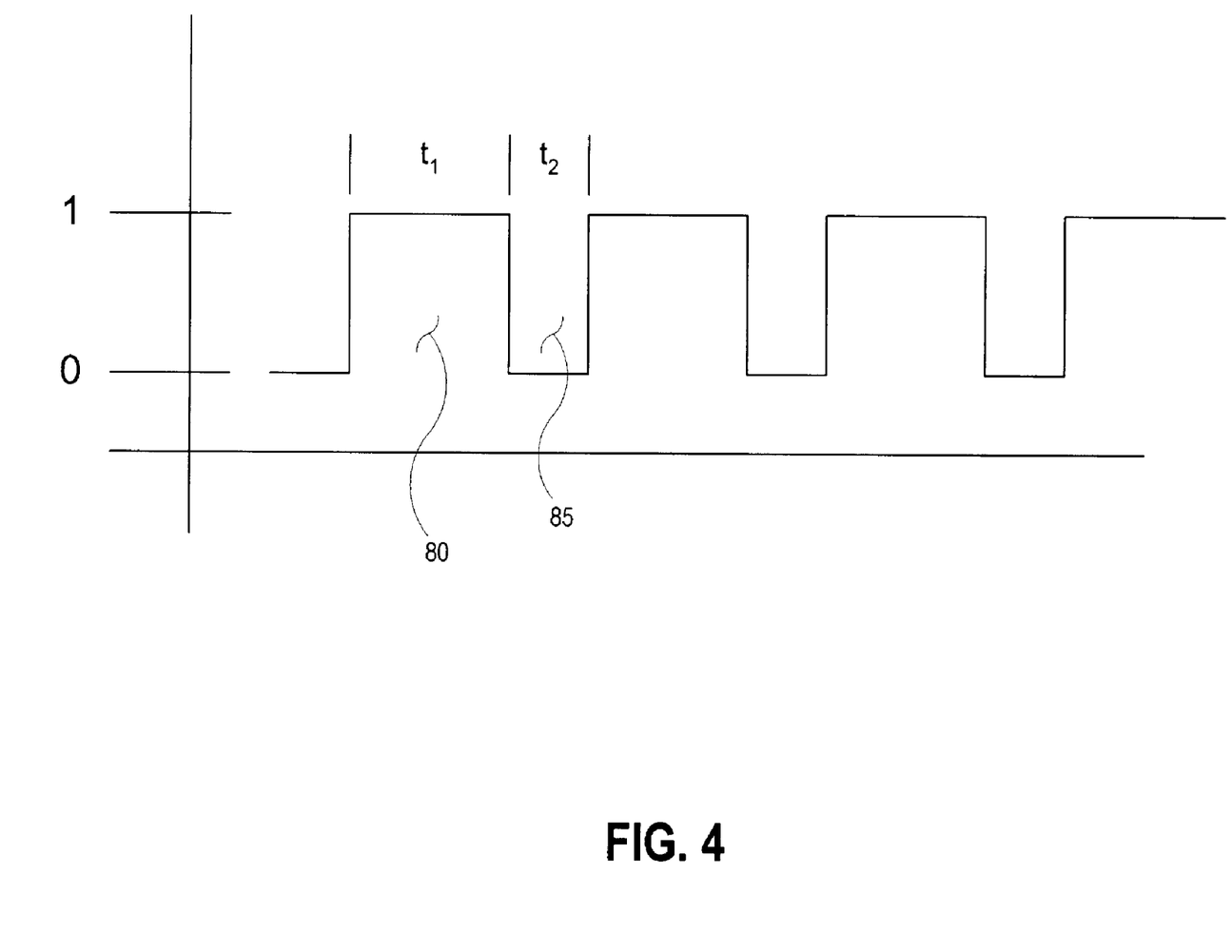
FIG. 4 is in a pictorial representation that depicts a process for modulating power to an actuator in order to control the power level said actuator may apply to a deployable member comprising a user interface device.

FIG. 4 is in a pictorial representation that depicts a process for modulating power to an actuator in order to control the power level said actuator may apply to a deployable member comprising a user interface device. According to this illustrative method of the present invention, the power level that may be applied to the deployable member comprising a user interface may be controlled in order to prevent injury to property or person. According to one variation of this method, the actuator may be enabled at substantially full power for a first time period $t_1$ (80) and then disabled for a second time period $t_2$ (85). By varying the ratio of the first time period $t_1$ to the second time period $t_2$, the amount of power that may be delivered to the actuator can be controlled. This power throttling technique, which is commonly referred to as pulse-width-modulation, may be used to control the amount of power applied to the actuator in order to cause the deployable member to begin deployment. This technique may also be used to apply a holding power level to the deployable actuator in order to maintain its contact with a deployment stop. Typically, the ratio of $t_1$ to $t_2$ may need to be established empirically based on the amount of force that needs to be applied to the deployable member during the clearance interval. A different ratio may need to be applied in order to apply a holding force to the deployable member. This second ratio may also need to be empirically derived.

One significant variation of this method provides that power control, as used in reducing power during the clearance interval and when the deployable member must be held in place in it's fully deployed position, may be accomplished by controlling the amount of electrical current that may be delivered to the actuator in the case where the actuator is an electrical device.

According to one additional variation of the present method, mechanical energy from the deployable member may need to be dissipated prior to reaching the fully deployed position. Where the actuator is an electrical device that may comprise an electrical coil contained within a magnetic field, mechanical energy may be dissipated through an electrical breaking means. Typically, this may be achieved by causing the electrical coil to resist changes in a magnetic field for a pre-established braking period. Once this is done, the example method of the present invention provides for applying a holding level force to the deployable member. According to one variation of this method, the step of reducing power to the holding level may be initiated when an indication is received from a full deployment sensor that the deployable member has reached the full deployment position. Commensurate with the need to dissipate energy before reaching the full deployment position, the method provides that the full deployment indication should be advanced in order to allow for the aforementioned braking period.

Figure 5:
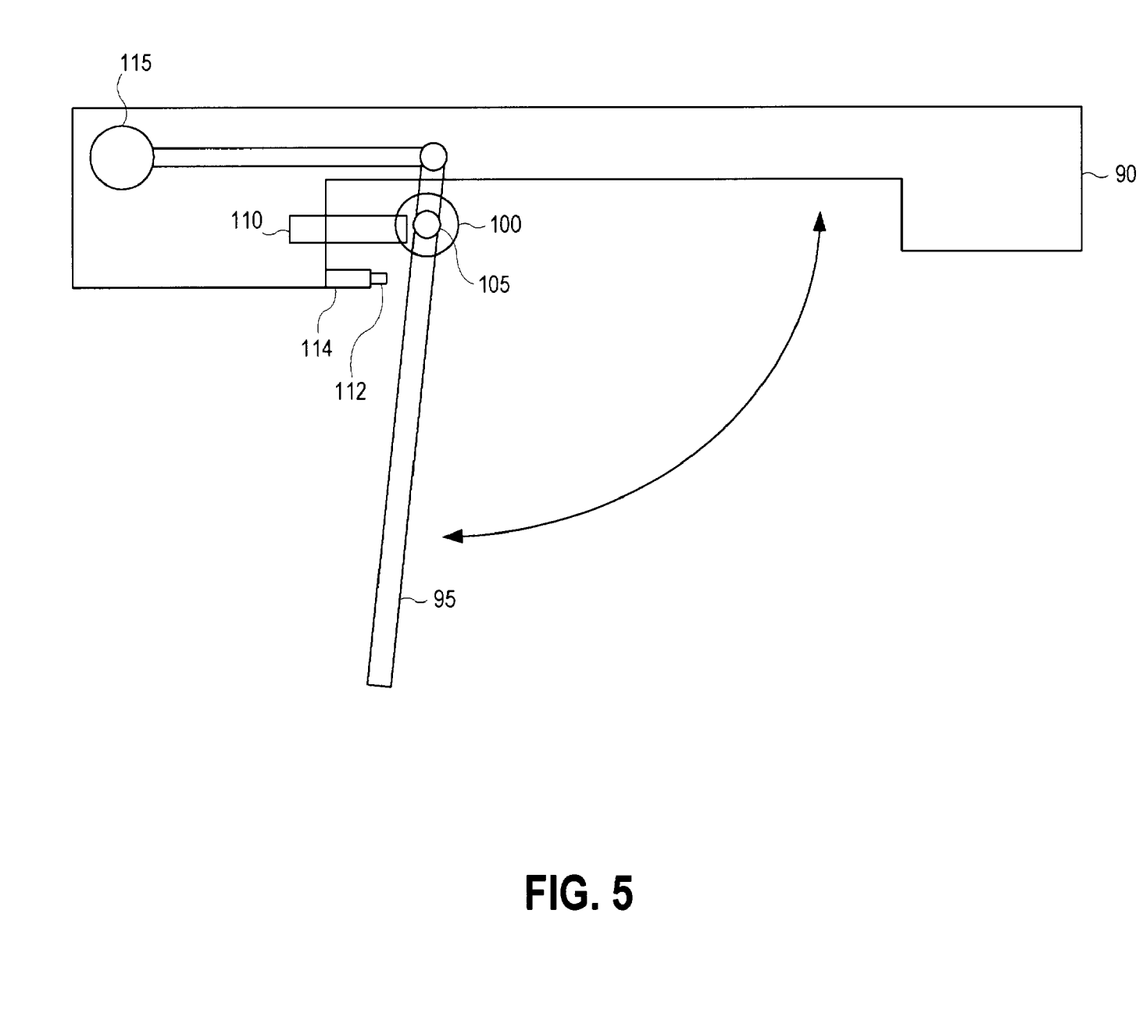
FIG. 5 is a pictorial representation of one illustrative embodiment of a controlled force deployable user interface according to the present invention.

FIG. 5 is a pictorial representation of one illustrative embodiment of a controlled force deployable user interface according to the present invention. The deployable user interface typically comprises a mounting structure 90. The mounting structure 90 may serve as a housing that may retain a deployable member 95 comprising the user interface. Typically, the position wherein the deployable member 95 is substantially retained in the housing is considered to be a "stowed" position. It should be noted that some alternative embodiments of this invention may not provide a housing per se. Rather, the deployable member may be pulled into a stowed position proximate to a mounting surface or to the surface of the mounting structure 90. It should be noted that the scope of the present invention should not be limited to any particular form of mechanical enclosure that may be used to mount and/or retain a deployable member comprising the user interface.

According to one example embodiment of the present invention, the deployable member 95 may be moveably mounted to the mounting structure 90. One such mounting that is not intended to limit the scope of the present invention may be pivot means wherein the deployable member 95 moves about a pivot point 105. According to one alternative embodiment of this invention, the motion sensor 110 may be coupled in a manner that allows the motion sensor 110 to monitor the movement of the deployable member 95 about the pivot point 105. One additional alternative embodiment of the present invention provides that the motion sensor 100 may monitor movement of the deployable member 95 according to an encoding wheel 100 attached to the deployable member 95 about the pivot point 105.

In one example embodiment of the present invention, the mounting structure 90 may further comprise a deployment stop 114 having a stopping surface. Generally, the stopping surface is the surface that contacts the deployable member in order to prevent further movement of the deployable member 95 about the pivot point 105. A full deployment sensor 112 may further comprise the invention and may be disposed at the stopping surface of the deployment stop 114. The deployment sensor 112 typically generates a full deployment signal when the deployable member 95 has reached the stopping surface comprising the deployment stop 114.

The deployable user interface of the present invention may further comprise an actuator 115 that may impart force upon the deployable member 95 in order to cause the deployable member 95 to move about the pivot point 105.

Figure 6:
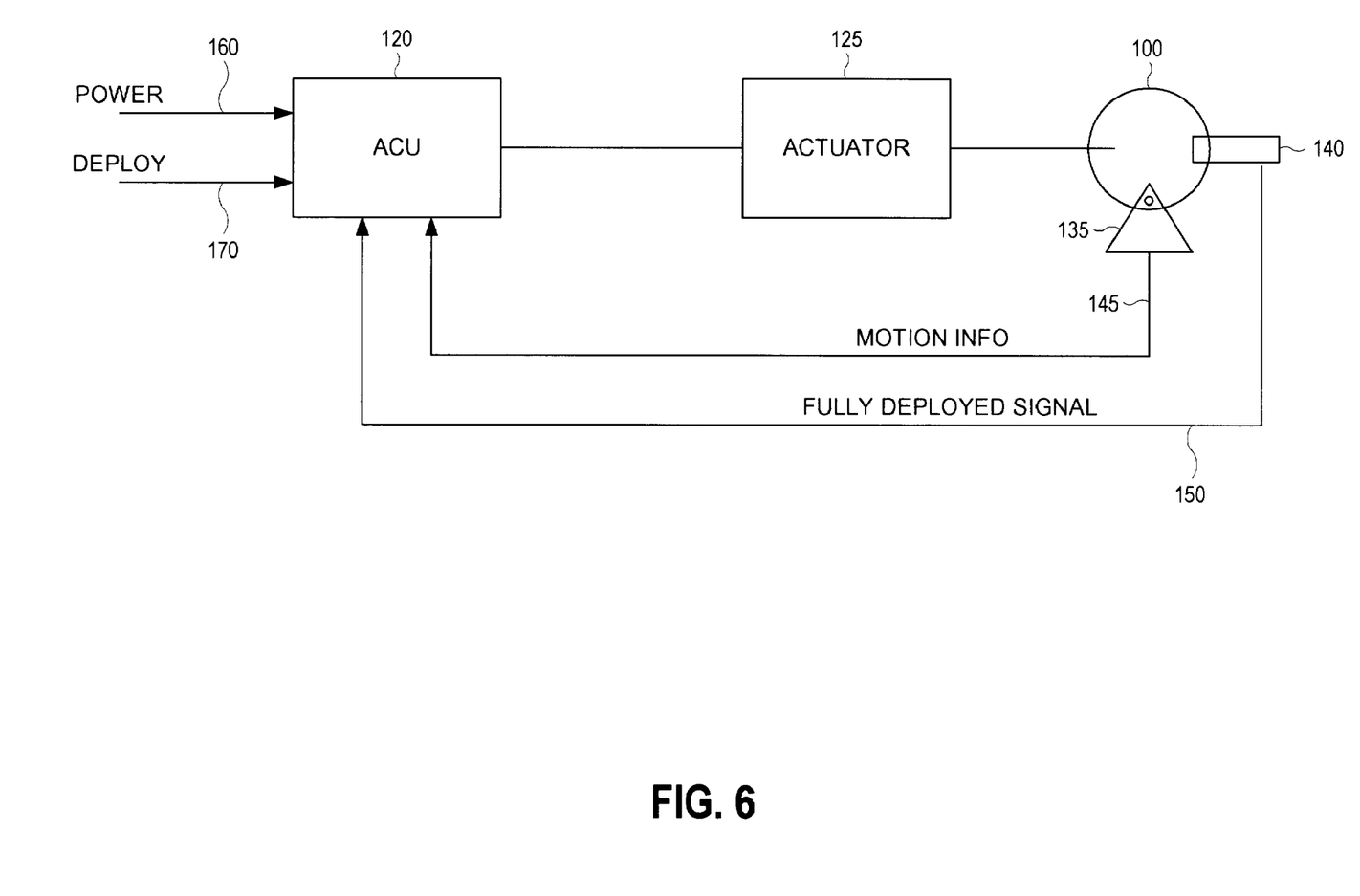
FIG. 6 is a block diagram that depicts one possible internal electrical configuration of a deployable user interface according to the present invention.

FIG. 6 is a block diagram that depicts one possible internal electrical configuration of a deployable user interface according to the present invention. In one alternative embodiment of the present invention, the user interface may be a display. The display may comprise a liquid crystal display element for displaying video and/or computer graphics to a user.

According to this one example embodiment, the deployable user interface may comprise an actuator control unit 120. Typically, the actuator control unit 120 comprises a power interface 160 and a deployment signal interface 170. According to this example embodiment, power for driving the actuator 125 is received by the actuator control unit 120 by way of the power interface 160. When the actuator control unit 120 receives a deployment signal by way of the deployment signal interface 170, it may apply power to the actuator 125 in order to cause the deployable member to begin deploying toward the fully deployed position.

According to yet another alternative embodiment of the present invention, the deployable member 95 may be coupled to the encoding wheel 100. An optical sensor 135 may further comprise the invention and may sense encoding on the encoding wheel 100 in order to determine motion information 145 that may then be conveyed to the actuator control unit 120. One derivative of this invention provides that the encoding wheel 100 further comprise a "fully deployed" marker that may be sensed by a full deployment sensor 140. When the full deployment sensor 140 perceives the fully deployed marker comprising the encoding wheel 100, it may then generate a fully deployed signal 150 that may be conveyed to the actuator control unit 120. It should be noted that this embodiment is an alternative to that already taught wherein the full deployment sensor is disposed in a matter so as to physically perceive contact of the deployable member 95 with the stopping surface of the deployment stop 114. Many other methods for sensing motion and the fully deployed position may be evident upon continued study of this disclosure and its accompanying drawings. Hence, all of these other sensing means are intended to be included in the scope the present invention. In one alternative embodiment of this invention, the fully deployed marker comprising the encoding wheel 100 may be advanced so to provide for a braking period prior to actual complete deployment of the deployable member 95.

Figure 7:
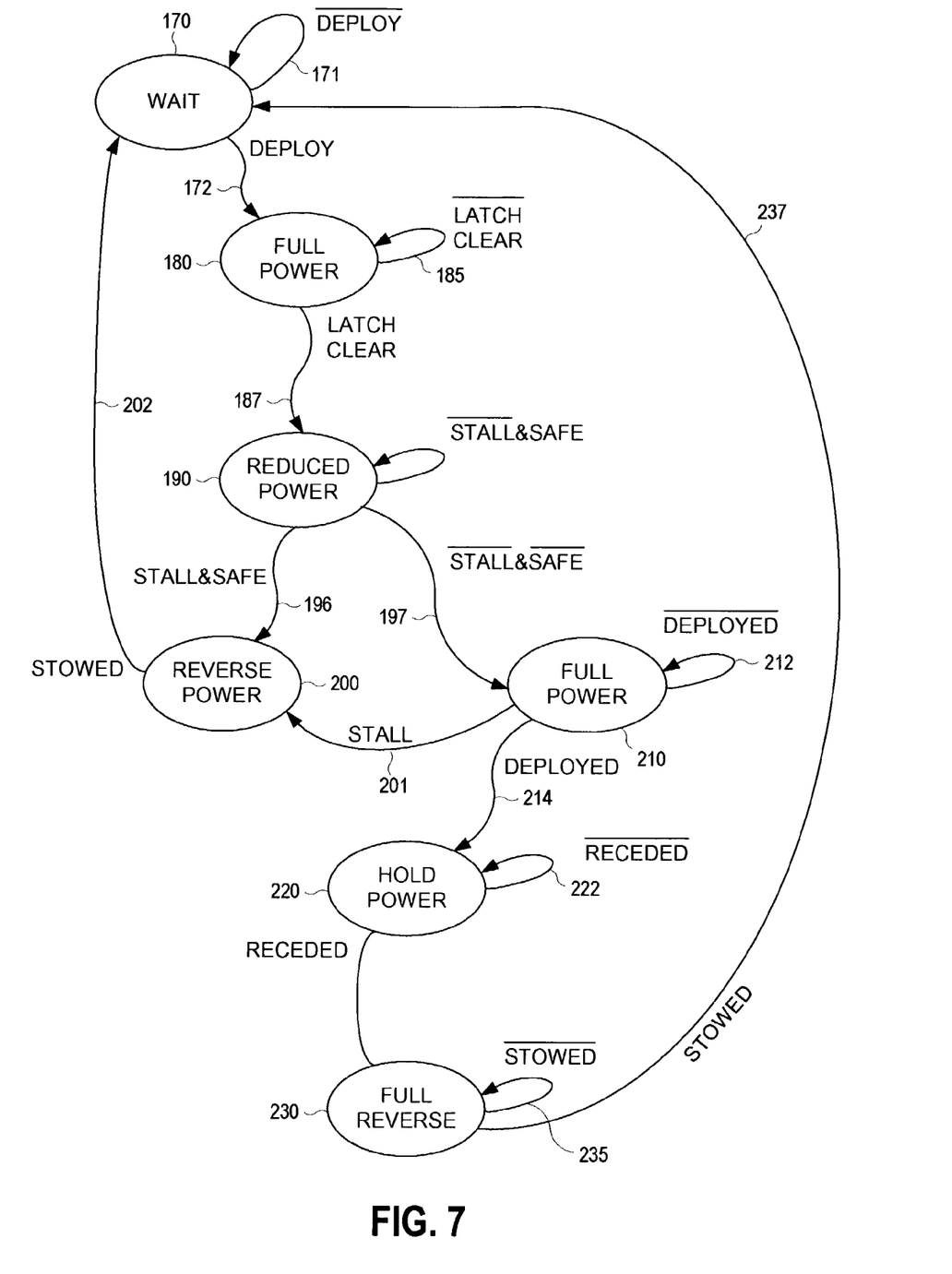
FIG. 7 is a state transition diagram that depicts the function of one example embodiment of an actuator control unit according to the present invention.

FIG. 7 is a state transition diagram that depicts the function of one example embodiment of an actuator control unit according to the present invention. According to this illustrative embodiment of the present invention, the actuator control unit 120 may comprise a state machine that controls the amount and polarity of power applied to the actuator 125 as it transitions through a sequence of operating states.

Typically, the state machine begins operation in a wait state 170. While in the wait state 170, the state machine monitors the deployment signal interface 170 comprising the actuator control unit 120. So long as the deployment signal is not active 171, the state machine remains in the wait state 170. When the deployment signal becomes active 172, the state machine may begin applying power to the actuator in order to cause the user interface assembly to begin moving out of a stowed position. This may be done by moving directly to a reduced power state 190 commensurate with the method of the present invention (i.e. obstacle clearance). However, in one alternative embodiment of the present invention, the state machine may transition to a full power state 180. It may remain in the full power state 180 so long as a mechanical latch clearance interval 185 has not expired. As soon as the mechanical latch clearance interval has expired 187, the state machine may move to a reduce power state 190 in order to provide reduced power to the actuator during the obstacle clearance interval.

According to one alternative embodiment of the present invention, the state machine may consider the rate of motion that the deployable member 95 exhibits as it pivots about the pivot point 105 during the obstacle clearance interval. If the rate of motion is less than a pre-established threshold, the deployable member 95 is inferred to have been stalled by an obstacle. Hence, so long as the deployable member 95 has not stalled and the obstacle clearance interval has not expired 195, the method of the present invention provides for maintaining the actuator at a reduce power level.

According to this illustrative embodiment, the state machine may move into a reverse power state 200 if the rate of motion falls below the pre-established threshold during the obstacle clearance interval 196. In this reverse power state 200, the state machine provides for applying reverse power to the actuator in order to cause the deployable member 95 to be retracted. Once the deployable member 95 is stowed 202, the state machine may move back to the wait state 170.

This example embodiment illustrates that once the obstacle clearance interval has expired and the rate of motion exhibited by the deployable member 95 has not fallen below a second pre-established threshold (i.e. not stalled) 197, the state machine may move to a full power state 210. The state machine may remain in the full power state 210 so long as deployable member 95 is not fully deployed 212. Once it is fully deployed 214, the state machine made proceed to a hold power state 220. According to this embodiment of invention, the state machine may remain in the hold power state 220 so long as deployable member 95 has not receded 222 from its full deployment position by a pre-established amount. In the event that the state machine perceives an excessive amount of recession of the deployable member 95 from the fully deployed position, it may enter a full reverse state 230 in order to retract the deployable user interface. Full reverse power may be applied so long as the deployable member 95 is not fully stowed 235. Once it is fully retracted 237, the state machine may move back to the original wait state 170.

In yet another alternative embodiment of the present invention, the state machine may further consider the rate of motion exhibited by the deployable member while in the full power state 210. If the rate of motion during full power deployment fails to meet a yet a third, empirically derived rate threshold, the actuator control unit may infer that an obstacle has been encountered. Hence, a stall signal 201 may cause the state machine to transition to the reverse power state 200 so that the deployable member may be retracted into the stowed position.

According to this example embodiment of the present invention, the power level applied to the actuator by the actuator control unit 120 may be reduce according to two different requirements. According to one illustrative embodiment of the present invention, power reduction may be accomplished by pulse-width-modulating the power applied to the actuator. According to another alternative embodiment of this invention, power reduction may be accomplished by reducing the current applied to an electrical actuator.

The present invention provides for dissipating mechanical energy carried by the deployable member 95 as it moves toward a fully deployed position. According to one illustrative embodiment of the present invention, this excess mechanical energy may be dissipated where the actuator is an electrical device comprising a coil contained in a magnetic field. Typical of these types of devices are motors and/or linear actuators. It should be noted that several various types of actuators may comprise coils contained in a magnetic field and all of these are intended to be within the scope of the present invention.

Typically, the electrical coil comprising the actuator comprises a plurality of connection leads. When these are shorted together, a braking effect is realized because the coil will resist any kind of change in the magnetic field that may be induced by the continued movement of the deployable member 95. Shorting the connection leads of the coil may be accomplished using a wide variety of methods. One such method would be to directly short the leads together. According to yet another embodiment of this invention, transistor switches may be used to connect all of the connection leads comprising the electrical coil to the same potential level. In many cases this may be "ground".

As with any embodiment of an electrical apparatus, application of full power or reverse power is intended to include minor variations in the amount of power that is applied. Hence, according to derivative embodiments of the present apparatus, full power or full reverse power may be taken as substantially full power or substantially reverse power.

ALTERNATIVE EMBODIMENTS

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents.

The present method and apparatus varies the power applied to an actuator according to a varying force profile. In some case, the amount of power that is applied is increased to enable rapid deployment. It should be noted that variations in the method and apparatus described here, such as providing an actuator that provides more power than is otherwise necessary to achieve rapid deployment and then providing power at some reduced power level (i.e. not substantially full power or reverse power) during a clearance interval or holding phase of operation are intended to be included in the scope of the present invention.

What is claimed is:

1. A method for driving a deployable user interface device onboard an aircraft comprising the steps of:
receiving motion information from the deployable device, regarding motion of the deployable device;
wherein said deployable device comprises an inflight passenger electronic user interface apparatus, which is configured to be deployed from a stowed position to a position from which the electronic user interface apparatus is configured to provide enhanced utility;
applying power to an actuator in order to cause the deployable device to begin deployment;
reversing power to the actuator if deployment of the deployable device has been physically retarded which is indicated if the rate of motion as indicated by the motion information is less than a first pre-established rate threshold;
increasing the power applied to the actuator if the rate of motion as indicated by the motion information has exceeded a second pre-established rate threshold for a set period of time; and
decreasing the power applied to the actuator to a holding level if the full-deployment indicator becomes active.

2. The method of claim 1 further comprising the step of reversing power to the actuator if the motion information indicates that the deployable device has receded from the fully deployed position by a pre-established recession threshold.

3. The method of claim 1 further comprising the step of reversing power to the actuator if the rate of motion as indicated by the motion information falls below a third rate of motion threshold after power has been increased to the actuator and the full-deployment signal is not received.

4. The method of claim 1 wherein the step of applying power to the actuator in order to cause the device to begin deployment comprises the steps of:
applying substantially full power to the actuator until the deployable device has cleared a latch assembly; and
applying a reduced power level to the actuator device.

5. The method of claim 1 wherein the step of applying power to the actuator in order to cause the device to begin deployment comprises the step of cyclically applying power for a first time period and then removing the power for a second time period to the actuator in order to limit the force applied by the actuator to the deployable device to a pre-established force threshold.

6. The method of claim 1 wherein the actuator is an electric device and the step of applying power to the actuator in order to cause the device to begin deployment comprises the step of reducing the electrical current delivered to the actuator in order to limit the force applied by the actuator to the deployable device to a pre-established force threshold.

7. The method of claim 1 wherein the step of decreasing the power applied to the actuator to a holding level comprises the step of cyclically applying power for a first time period and then removing the power for a second time period to the actuator in order to maintain contact with a deployment stop.

8. The method of claim 1 wherein the actuator is an electrical device that comprises an electrical coil contained within a magnetic field and wherein the step of decreasing the power applied to the actuator to a holding level comprises the steps of:
causing the electrical coil to resist changes in the magnetic field for a pre-established braking period; and
cyclically applying power for a first time period and then removing the power for a second time period to the actuator in order to maintain contact with a deployment stop.

9. A deployable user interface device onboard an aircraft comprising:
base structure for mounting the user interface device;
inflight user interface assembly that is moveably mounted to the base structure;
motion sensor that is coupled to the user interface assembly and provides motion information according to the motion of said user interface assembly;
full-deployment sensor coupled to the user interface assembly that generates a full-deployment signal when the user interface assembly is fully deployed;
actuator that, when it receives power, minimally causes the user interface assembly to move from a stowed position to a deployed position; and
actuator control unit that:
applies power to the actuator in order to cause the user interface assembly to begin moving out of the stowed position;
reverses the power applied to the actuator if the rate of motion as indicated by the motion sensor is less than a first pre-established rate threshold;
increases the power applied to the actuator if the rate of motion as indicated by the motion sensor exceeds a second pre-established rate threshold for a set period of time; and
decreases the power applied to the actuator to a holding level if the full-deployment signal is received.

10. The deployable user interface of claim 9 wherein the actuator control unit further reverses power to the actuator if the motion information received from the motion sensors indicates that the user interface assembly has receded from the fully deployed position by a pre-established recession threshold.

11. The deployable user interface of claim 9 wherein the actuator control unit further reverses power to the actuator if the rate of motion as indicated by the motion sensor is less than a third pre-established rate threshold after power applied to the actuator has been increased and the full-deployment signal has not been received.

12. The deployable user interface of claim 9 wherein the actuator control unit applies power to the actuator in order to cause the user interface assembly to begin moving out of the stowed position by applying substantially full power to the actuator for a pre-established latch clearance time and reducing the power level applied to the actuator in order to reduce the force applied by the actuator to the user interface assembly.

13. The deployable user interface of claim 9 wherein the actuator control unit further comprises a pulse-width-modulated power controller that cyclically applies power to the actuator for a first time period and then removes power from the actuator for a second time period in order to limit the force applied to the user interface assembly to a pre-established safety force threshold.

14. The deployable user interface of claim 9 wherein the actuator is an electrical device and wherein the actuator control unit further comprises a current regulator that reduces the electrical current delivered to the actuator in order to limit the force applied to the user interface assembly to a pre-established force threshold.

15. The deployable user interface of claim 9 wherein the actuator control unit further comprises a pulse-width-modulated power controller that cyclically applies power to the actuator for a first time period and then removes power from the actuator for a second time period in order to limit the force applied to the user interface assembly to a pre-established holding force threshold.

16. The deployable user interface of claim 9 wherein the actuator is an electrical device that comprises an electrical coil having a plurality of input leads contained in a magnetic field and wherein the actuator control unit further comprises:
   electrical braking circuit; and
   pulse-width-modulated power controller and wherein the actuator control unit decreases the power applied to the actuator to a holding level by causing the electrical braking circuit to connect the input leads of the actuator to each other for a pre-established braking period and then causing the pulse-width-modulator to cyclically apply power to the actuator for a first period of time and then remove power from the actuator for a second period of time.

17. A deployable overhead display unit comprising:
   base structure for mounting the overhead display unit onboard an aircraft;
   display screen that is pivotally mounted to the base structure to provide an inflight interface;
   motion sensor that is coupled to the display screen and provides motion information according to the motion of said display screen;
   full-deployment sensor coupled to the display screen that generates a full-deployment signal when the display screen is fully deployed; actuator that, when it receives power, causes the display screen to pivot about its mounting; and
   actuator control unit that:
   applies power to the actuator in order to cause the display screen to begin moving out of a stowed position;
   reverses the power applied to the actuator if the rate of motion as indicated by the motion sensor is less than a first pre-established rate threshold;
   increases the power applied to the actuator if the rate of motion as indicated by the motion sensor exceeds a second pre-established rate threshold for a set period of time; and
   decreases the power applied to the actuator to a holding level if the full-deployment signal is received.

18. The deployable overhead display unit of claim 17 wherein the actuator control unit further reverses power to the actuator if the motion information received from the motion sensors indicates that the display screen has receded from the fully deployed position by a pre-established recession threshold.

19. The deployable user interface of claim 17 wherein the actuator control unit further reverses power to the actuator if the rate of motion as indicated by the motion sensor is less than a third pre-established rate threshold after power applied to the actuator has been increased and the full-deployment signal has not been received.

20. The deployable overhead display unit of claim 17 wherein the actuator control unit applies power to the actuator in order to cause the user interface assembly to begin moving out of a stowed position by applying substantially full power to the actuator for a pre-established latch clearance time and reducing the power level applied to the actuator in order to reduce the force applied by the actuator to the display screen.

21. The deployable overhead display unit of claim 17 wherein the actuator control unit further comprises a pulse-width-modulated power controller that cyclically applies power to the actuator for a first time period and then removes power from the actuator for a second time period in order to limit the force applied to the display screen to a pre-established safety force threshold.

22. The deployable overhead display unit of claim 17 wherein the actuator is an electrical device that comprises an electrical coil having a plurality of input leads and which is contained in a magnetic field and wherein the actuator control unit further comprises:
   electrical braking circuit; and
   pulse-width-modulated power controller and wherein the actuator control unit decreases the power applied to the actuator to a holding level by causing the electrical braking circuit to connect the input leads of the actuator to each other for a pre-established braking period and then causing the pulse-width-modulator to cyclically apply power to the actuator for a first period of time and then remove power from the actuator for a second period of time.

* * * * *